(12) United States Patent
Koguchi et al.

(10) Patent No.: US 8,437,905 B2
(45) Date of Patent: May 7, 2013

(54) METHOD OF CALCULATING DEFLECTION OF ROTATING TIRE, METHOD OF ACCUMULATING DATA OF ROTATING TIRE, METHOD OF CALCULATING CONTACT LENGTH OF ROTATING TIRE

(75) Inventors: Noritaka Koguchi, Kanagawa (JP); Naoshi Miyashita, Kanagawa (JP); Jun Matsuda, Kanagawa (JP); Tsuyoshi Kitazaki, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 198 days.

(21) Appl. No.: 11/916,811

(22) PCT Filed: Apr. 20, 2007

(86) PCT No.: PCT/JP2007/058615
§ 371 (c)(1),
(2), (4) Date: Dec. 6, 2007

(87) PCT Pub. No.: WO2007/123196
PCT Pub. Date: Nov. 1, 2007

(65) Prior Publication Data
US 2009/0118891 A1  May 7, 2009

(30) Foreign Application Priority Data
Apr. 21, 2006 (JP) ................. 2006-117838

(51) Int. Cl.
*G06F 11/30* (2006.01)
*G07C 5/08* (2006.01)
*G07C 5/00* (2006.01)
*B60G 13/00* (2006.01)
*B62D 17/00* (2006.01)

(52) U.S. Cl.
USPC ........ 701/29.1; 701/31.4; 701/34.4; 280/5.52

(58) Field of Classification Search ................. 701/1, 29, 701/30, 35, 36, 41, 70–72, 74, 75, 80, 93; 73/146, 146.2, 146.5, 570; 280/5.52, 5.521, 280/86.75, 86.751; 702/138, 141, 142, 145–147, 702/155, 157, 158, 167
See application file for complete search history.

(56) References Cited

U.S. PATENT DOCUMENTS

| 6,538,566 B1 * | 3/2003 | Morand et al. ............. 340/444 |
| 7,203,579 B2 * | 4/2007 | Yokota et al. ............... 701/29 |
| 2004/0134269 A1 * | 7/2004 | Sugisawa ..................... 73/146 |

FOREIGN PATENT DOCUMENTS

| JP | 2002-511812 | 4/2002 |
| JP | 2002-340863 | 11/2002 |

(Continued)

OTHER PUBLICATIONS

International Search Report from PCT/JP2007/058615 dated May 29, 2007.

*Primary Examiner* — Thomas Tarcza
*Assistant Examiner* — Adam Tissot
(74) *Attorney, Agent, or Firm* — Knobbe Martens Olson & Bear LLP

(57) ABSTRACT

A method of calculating deflection of a rotating tire, through high speed data processing, based on measurement time series data of acceleration on a tire tread portion has the following steps. A step of acquiring measurement time series data of acceleration on a tire circumference in a radial direction of a rotating tire; a step of extracting acceleration data in a vicinity of a contact region from the acquired measurement data and subjecting the extracted acceleration data to least-square regression using a second-order differential function expression of a deflection function expression that represents a peak shape having a peak value and a curve gradually approaching to zero on both sides thereof, whereby a deflection function parameter values are determined; and a step of calculating a contact deflection from the deflection function expression determined by the deflection function parameter values.

17 Claims, 8 Drawing Sheets

FOREIGN PATENT DOCUMENTS

| | | |
|---|---|---|
| JP | 2003-182476 | 7/2003 |
| JP | 2004-340616 | 12/2004 |
| JP | 2005-521866 | 7/2005 |
| JP | 2005-343281 | 12/2005 |
| JP | 2006-145366 | 6/2006 |
| WO | WO 2007/123196 | 11/2007 |

* cited by examiner

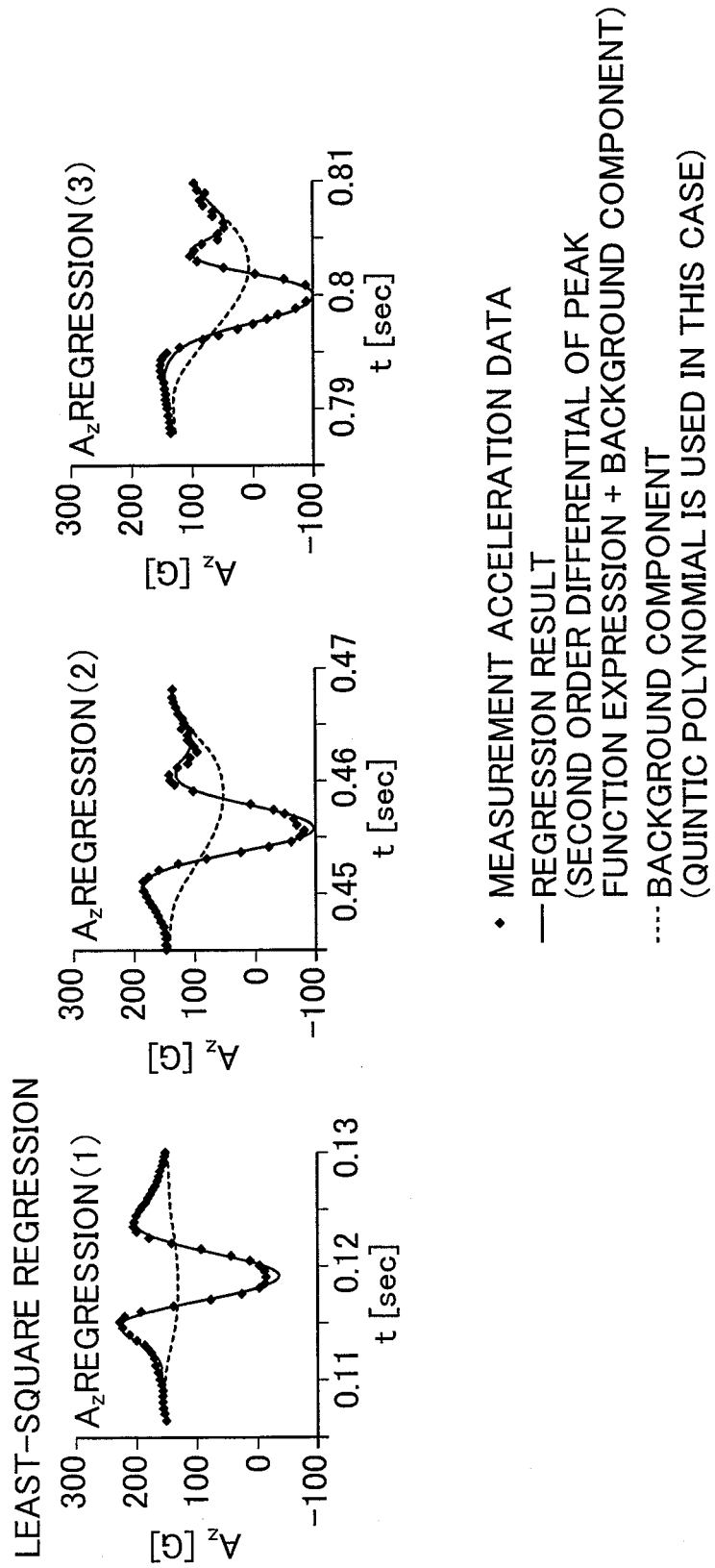

DEFLECTION FUNCTION
EXPRESSION T(t)

SECOND ORDER DIFFERENTIAL OF
DEFLECTION FUNCTION
EXPRESSION T(t)

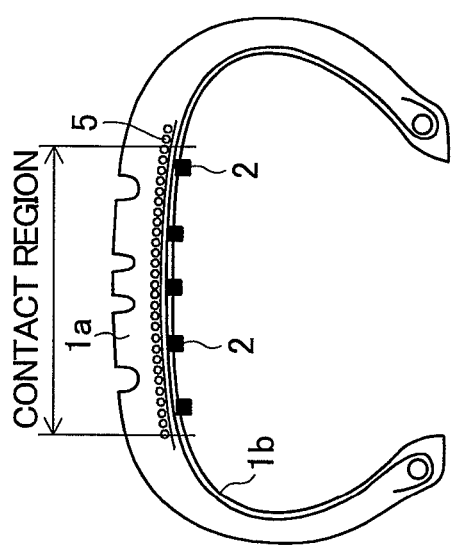
FIG. 7C MOUNTED ON LINER PORTION
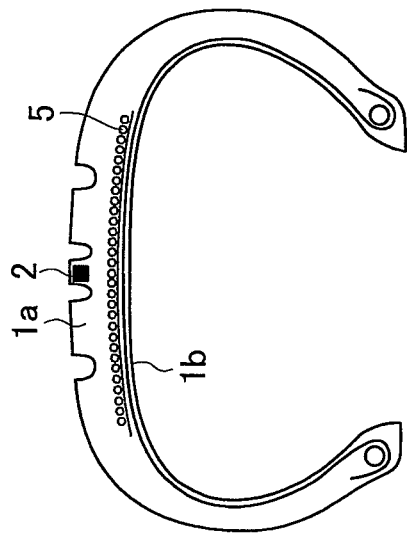
FIG. 7B MOUNTED INSIDE CAP TREAD
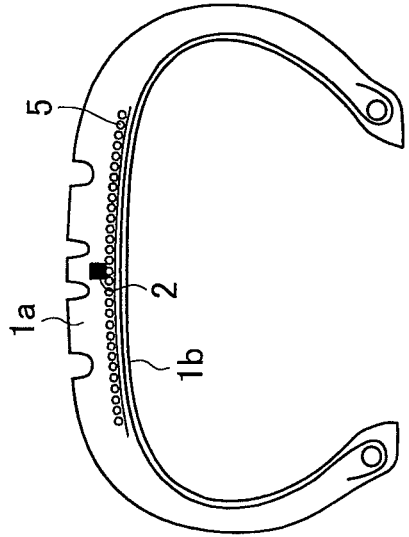
FIG. 7A MOUNTED ON BELT PLY OUTER PERIPHERY

METHOD OF CALCULATING DEFLECTION OF ROTATING TIRE, METHOD OF ACCUMULATING DATA OF ROTATING TIRE, METHOD OF CALCULATING CONTACT LENGTH OF ROTATING TIRE

CROSS REFERENCE TO RELATED APPLICATION

This application claims the benefit and priority to PCT Application Number PCT/JP2007/058615, filed on Apr. 20, 2007, which claims priority to Japanese Patent Application No. 2006-117838, filed on Apr. 21, 2006, the disclosures of which is hereby incorporated by reference in their entireties.

TECHNICAL FIELD

The present invention relates to a method of calculating deflection of a rotating tire, that calculates a deflection at a tire tread portion in the radial direction while the tire is rotating on a road surface, and also relates to a method of accumulating data of a rotating tire, that accumulates the deflection data, as well as a method of calculating a contact length of a rotating tire.

BACKGROUND ART

Conventionally, in order to acquire a distribution of deformation shapes on a circumference of a rotating tire at a tread portion, or to acquire a contact length of a rotating tire, finite element models have been used to simulate rotating tires. In such acquiring method, it has been difficult to acquire the deformation shape at the tread portion or the contact length within a short period of time, because of the time required for creating a finite element model or for simulation calculation. Therefore, a contact length (dynamic contact length) and a deformation shape obtained with a non-rotating tire have been used in place of the contact length and the tire deformation shape of the rotating tire.

However, for estimating tire performance, it has been demanded to acquire the contact length and the deformation shape by measuring the rotating tire, since the contact length and the deformation shape on the tire circumference which in turn affects the contact patch shape have a significant influence to the tire performance during rotation.

In the following Patent Documents 1 to 3, for instance, a method is disclosed in which an acceleration sensor is attached to a tire to acquire measurement data of acceleration of the tire during rotation, and from the acquired measurement data, power spectrums and vibration spectrums are obtained to estimate the status of the road during the tire rotation, and also a method is disclosed in which a timing at which a tread portion is in contact with a road surface is determined from measurement data of acceleration in a radial direction.

However, in Patent Documents 1-3, while the status of the road surface can be estimated using the measurement data, it is impossible to calculate a deformation shape of a rotating tire or a dynamic contact length from the measurement data.
Patent Document 1: JP 2002-340863 A
Patent Document 2: JP 2003-182476 A
Patent Document 3: JP 2002-511812 A

DISCLOSURE OF THE INVENTION

Problems to be Solved by the Invention

In view of the foregoing, the present invention has an object to provide a method of calculating deflection of a rotating tire capable of calculating a distribution of deflections of the tire during rotation through high speed data processing.

The present invention has another object to provide a method of accumulating data of a rotating tire for accumulating the deflection data of the tire during rotation, in which data can be accumulated in a memory of a small capacity, even if the tire continue to run for a long period of time, and a rotation orbit of the tire can be reproduced from the tire radius and parameter values.

The present invention has still another object to provide a method of calculating a contact length of a rotating tire in which the rotation orbit and the contact length of the tire during rotation can be accurately calculated from the obtained parameter values.

Means to Solve the Problems

To solve the problem, the present invention provides a method of calculating deflection of a rotating tire that calculates a distribution of deflections at a tire tread portion in a radial direction of the tire when the tire is rotating on a road surface, the method comprising: an acquiring step of acquiring measurement time series data of acceleration on a tire circumference in a radial direction of a rotating tire; a least-square regression step of determining deflection function parameter values in such a manner that acceleration data in a vicinity of a contact region of the tire is extracted from the acquired measurement time series data of acceleration on the tire circumference, and the extracted acceleration data is subjected to least-square regression using a second-order differential function expression of a deflection function expression that represents a peak shape having a peak value and a curve which is gradually approaching to zero on both sides of the peak shape; and a calculation step of calculating a distribution of deflection of a tire during rotation from the deflection function expression determined by the deflection function parameter values.

In the invention, the deflection function expression that represents the peak shape is preferably an asymmetrical Gaussian type function expression having a curve representing an asymmetrical shape on both sides of a peak, in accordance with the parameter values.

Preferably, the deflection function expression is any one of formulas (1-1), (1-2), (1-3), (1-4) and (1-5) below:

[Formula 1]

$$T(t) = a \cdot \exp\left(-\frac{t^2}{ct+d}\right) \quad \text{Formula (1-1)}$$

$$T(t) = a \cdot \exp\left(-\frac{t^2}{d}\right) \quad \text{Formula (1-2)}$$

$$T(t) = \frac{a^2}{t^2+d} \quad \text{Formula (1-3)}$$

$$T(t) = \frac{a}{t^2+ct+d} \quad \text{Formula (1-4)}$$

$$T(t) = a|t|^p \quad \text{Formula (1-5)}$$

The measurement time series data of acceleration in the radial direction is preferably data acquired by an acceleration sensor mounted on the tire tread portion, the acceleration sensor being adapted for measuring acceleration in the radial direction.

The acceleration sensor is preferably mounted at a center in a width direction of the tire tread portion, on a liner portion, on an outer periphery of a belt ply, or inside a cap tread.

As the acceleration sensor, a plurality of acceleration sensors are preferably mounted on the tire tread portion in the width direction, and measurement time series data of acceleration in the radial direction is obtained from each of the plurality of acceleration sensors.

To solve the problem, the present invention provides a method of accumulating data of a rotating tire, comprising: an acquiring step of acquiring measurement time series data of acceleration on a tire circumference in a radial direction of a rotating tire; a least-square regression step for determining deflection function parameter values in such a manner that acceleration data in a vicinity of a contact region of the tire is extracted from the acquired measurement time series data of acceleration on the tire circumference, and the extracted acceleration data is subjected to least-square regression using a second-order differential function expression of a deflection function expression that represents a peak shape having a peak value and a curve which is gradually approaching to zero on both sides of the peak shape; and an accumulating step of accumulating the deflection function parameter values determined in the least-square regression step as data at every round of tire rotation.

To solve the problem, the present invention also provides a method of calculating a contact length of a rotating tire, comprising: an acquiring step of acquiring measurement time series data of acceleration on a tire circumference in a radial direction of a rotating tire; a least-square regression step of determining deflection function parameter values in such a manner that acceleration data in a vicinity of a contact region of the tire is extracted from the acquired measurement time series data of acceleration on the tire circumference, and the extracted acceleration data is subjected to least-square regression using a second-order differential function expression of a deflection function expression that represents a peak shape having an peak value and a curve which is gradually approaching to zero on both sides of the peak shape; a calculation step of calculating a deflection in a vicinity of the contact region from the deflection function expression determined by using the deflection function parameter values; and a contact length calculating step for calculating a contact length of the rotating tire based on the deflection of the tire which is calculated in the calculation step.

The method of calculating a contact length of a rotating tire preferably includes: determining, in a tire rotation orbit represented by the curve of the deflection function expression that is determined by the deflection function parameter values, intersections between a horizontal line touching to a lowest point of the tire rotation orbit and an arcuate shaped rotation orbit representing zero deflection as A, B; determining a center of tire rotation as O; determining points on the horizontal line as point C and point D, provided that an angle ∠COD which is created by the points C and D, and the center of tire rotation O has a certain angle from 50 to 95% of an angle ∠AOB which is created by the intersections A, B and the center of tire rotation O; and determining the length between the point C and the point D as the contact length of the rotating tire.

Effects of the Invention

In the method of calculating deflection of a rotating tire according to the present invention, from measurement time series data of radial acceleration of a tire, acceleration data in the vicinity of a contact region is extracted; the extracted acceleration data is subjected to least-square regression by using a function expression that has been obtained by subjecting a deflection function expression to second-order differentiation, thus generating deflection function parameter values; and the deflection function parameter values thus obtained are used to calculate a distribution of deflections. Therefore the method is suitable for high speed data processing, and is capable of processing a distribution of deflections of a rotating tire easily at high speed. Moreover, the use of a deflection function expression that gradually approaches to zero on both sides ensures that low frequency background components that might be occurred due to tire rotation are prevented from being included.

In the method of accumulating data of a rotation tire according to the present invention, a distribution of deflections can be described using deflection function parameter values, so that the information of deflection of the tire can be accumulated in a memory of a small capacity. In addition, the rotation orbit of the rotating tire can be reproduced at high speed and with accuracy by the use of the deflection function parameters and the tire radius.

In the method of calculating a contact length of a rotating tire according to the present invention, the measurement acceleration data is subjected to least-square regression by using a second-order differential function expression of a deflection function expression, so that the rotation orbit and the contact length of the tire during rotation can be accurately calculated from the obtained distribution of deflections of the tire.

BRIEF DESCRIPTION OF THE DRAWINGS

FIG. 4B is a chart showing a result of least-square regression analysis performed on a signal waveform obtained by the method of calculating deflection of tire during rotation according to the present invention.

FIGS. 7A, 7B, and 7C are cross-sectional views showing variety of mounting positions of an acceleration sensor.

LEGEND

| | |
|---|---|
| 1 | tire |
| 1a | tread portion |
| 2 | acceleration sensor |
| 14 | signal processing unit |
| 16 | calculating unit |
| 10 | apparatus for evaluating deformation shape of tire |

BEST MODE FOR CARRYING OUT THE INVENTION

Hereinafter, the method of calculating deflection of a rotating tire, the method of accumulating data of a rotating tire, and the method of calculating a contact length of a rotating tire according to the present invention will be described in detail with reference to the preferred embodiments shown in the attached drawings.

Figure 1:
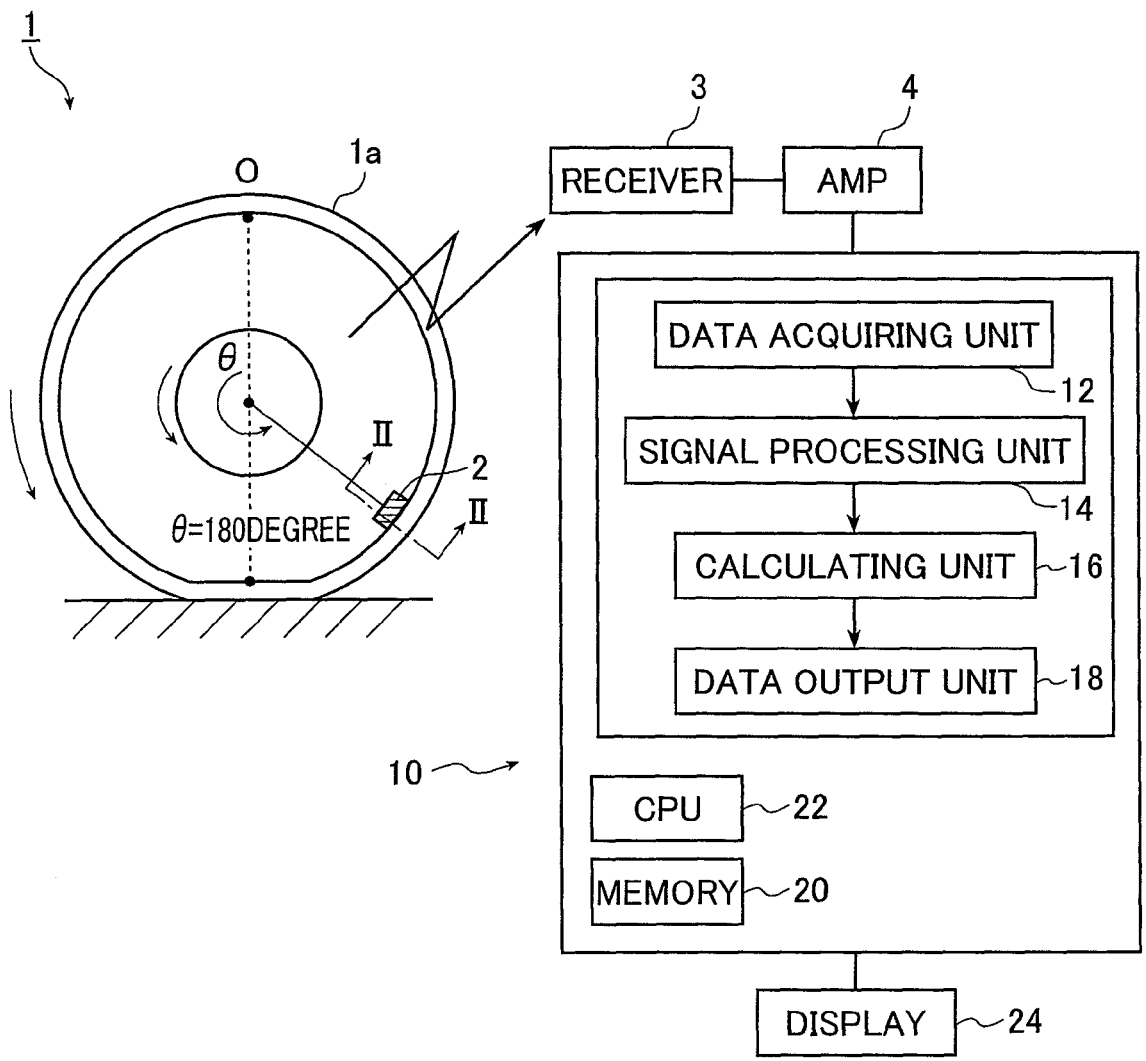
FIG. 1 is a block diagram showing an example of an apparatus implementing the method of calculating deflection of rotating tire according to the present invention.

FIG. 1 is a block diagram showing a structure of an embodiment of an apparatus that implements the method of calculating deflection of a rotating tire, the method of accumulating data of a rotating tire, and the method of calculating a contact length of a rotating tire according to the present invention.

Figure 2:
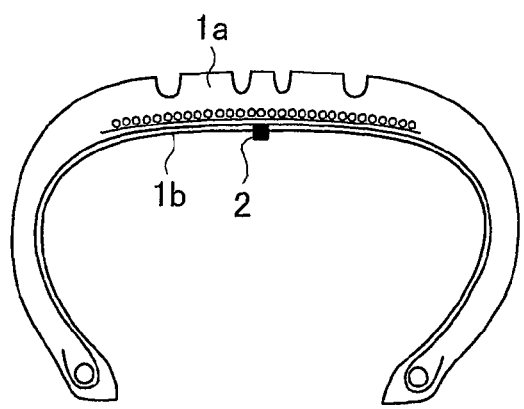
FIG. 2 shows a cross-sectional view as taken along II-II line of FIG. 1.

FIG. 2 shows a cross-sectional view as taken along II-II line of FIG. 1.

While the embodiment shown in FIGS. 1 and 2 is an example in which measurement time series data of acceleration is obtained by measuring acceleration on an inner circumferential surface of a tire tread portion, measurement time series data of acceleration may also be measured inside the tread portion, or on a belt portion, as will be described later.

A tire deformation shape evaluating apparatus 10 shown in FIG. 1 calculates a distribution of deflections of a tire using measurement data (acceleration data) of radial acceleration at a tread portion 1a of a tire 1. The acceleration at the tread portion 1a of the tire 1 is detected by an acceleration sensor 2 which is fixed to a liner portion 1b of the inner circumference of the tread portion 1a of the tire. The measurement time series data of acceleration thus detected is transmitted, by a transmitter (not shown) to a receiver 3, amplified by an amplifier 4 and then inputted to the tire deformation shape evaluating apparatus 10. The measurement time series data may be transmitted in various ways. For example, a transmitter may be provided on a wheel assembled to the tire to transmit the measurement data from the acceleration sensor 2 to the receiver 3, or a transmitting function may be added to the acceleration sensor 2 so that the data is transmitted from the acceleration sensor 2 to the receiver 3. Alternatively, an amplifier for amplifying the data from the acceleration sensor 2 and a transmitter may be both provided on the wheel and the data received by the receiver is supplied to the tire deformation shape evaluating apparatus 10.

The acceleration sensor 2 is exemplified by a semiconductor acceleration sensor, for example, disclosed in Japanese Patent Application No. 2003-134727 (JP 2004-340616 A) filed by the present applicant. The semiconductor acceleration sensor includes, specifically, an Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed.

By fixing the acceleration sensor 2 to the inner circumferential surface of the tread portion 1a, the acceleration applied to the tread portion 1a during tire rotation can be measured. The acceleration sensor 2 may be, in addition to the above, acceleration pickups that use piezoelectric elements for detecting acceleration or strain gage type acceleration pickups that incorporate strain gages for detecting acceleration. The measurement time series data of the acceleration sensor 2 may be transmitted from a transmitter provided on the acceleration sensor 2.

The tire deformation shape evaluating apparatus 10, to which the measurement time series data of acceleration amplified by the amplifier 4 is supplied, includes a data acquiring unit 12, a signal processing unit 14, a deformation shape calculating unit 16, and a data output unit 18. These units are formed by subroutines or sub-programs that work on a computer. In other words, execution of software on a computer having a CPU 20 and a memory 22, allows each of the above described units to function, whereby the tire deformation shape evaluating apparatus 10 is constituted.

Alternatively, instead of using a computer, the tire deformation shape evaluating apparatus of the present invention may be configured as a dedicated apparatus in which functions of individual units are configured by a dedicated circuit.

The data acquiring unit 12 is adapted for acquiring, as input data, measurement data of radial acceleration for a time period corresponding to at least one round of tire rotation, which has been amplified by the amplifier 4. The data supplied from the amplifier 4 is in a form of analog data which is then converted to digital data by sampling with a predetermined sampling frequency.

The signal processing unit 14 is adapted for extracting radial acceleration data from the digitized measurement time series data of acceleration, and for performing smoothing processing using a filter.

The calculating unit 16 is adapted for performing least-square regression based on the acceleration data from the signal processing unit 14, as will be described later, to determine a distribution of deflections of a tire during rotation and a dynamic contact length (contact length during tire rotation). Specific processing will be described later.

The data output unit 18 is adapted for generating output data of a dynamic contact length of a tire, and a rotation orbit of a tire tread portion which have been calculated based on the distribution of deflections or other calculation results. The output data is sent to a display 24, and used in, for example, displaying a graph.

Figure 3:
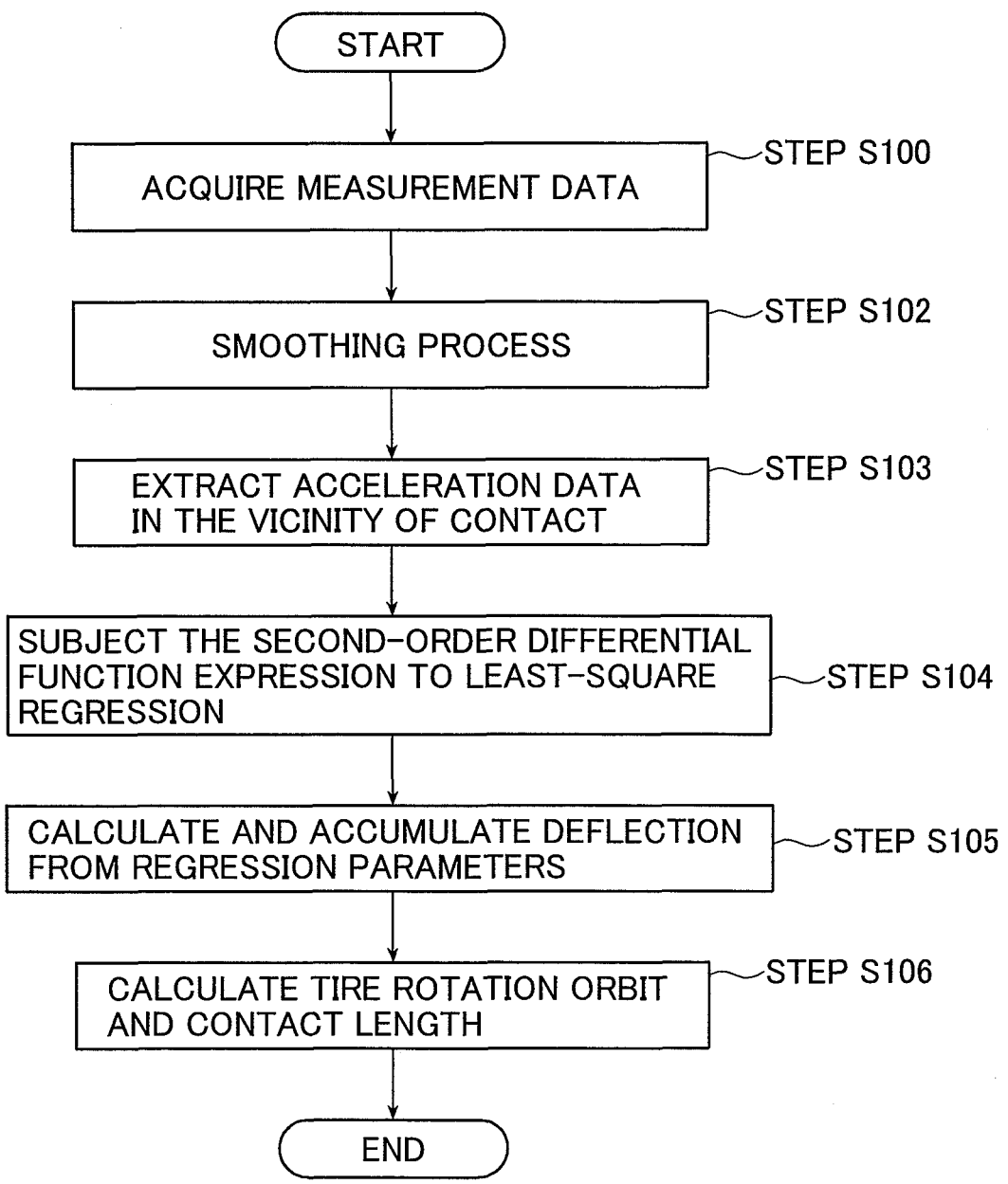
FIG. 3 shows a flowchart showing an example of flow of the method of calculating deflection of a rotating tire according to the present invention.
Figure 4A:
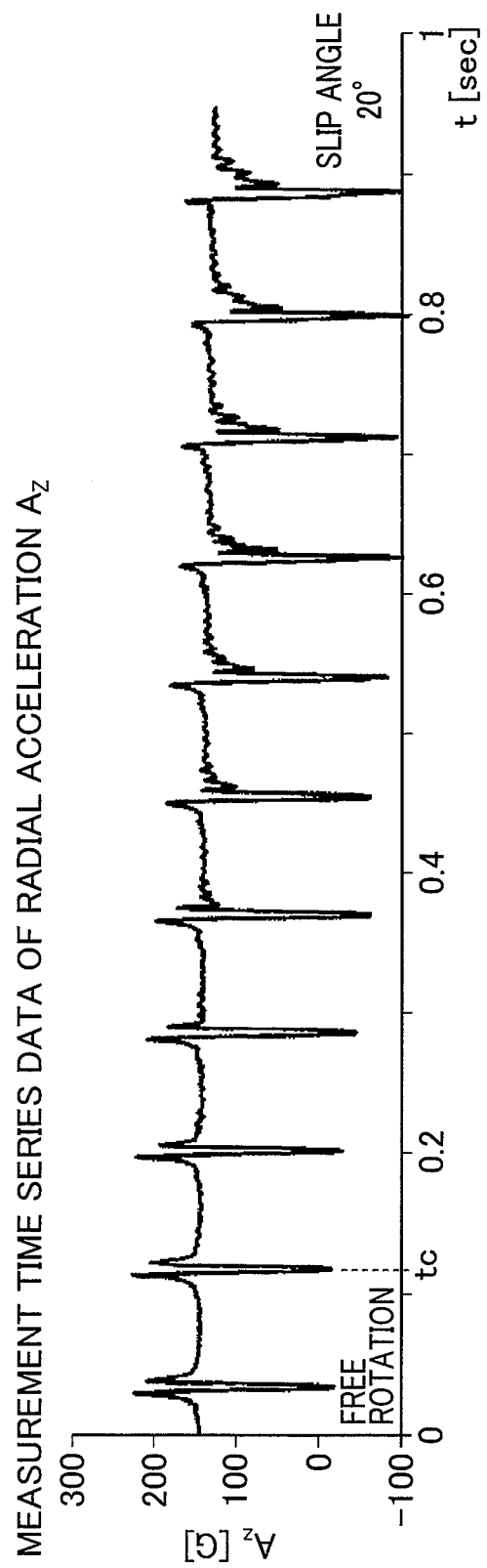
FIG. 4A shows a signal waveform obtained by the method of calculating deflection of a rotating tire according to the present invention.
Figure 4C:
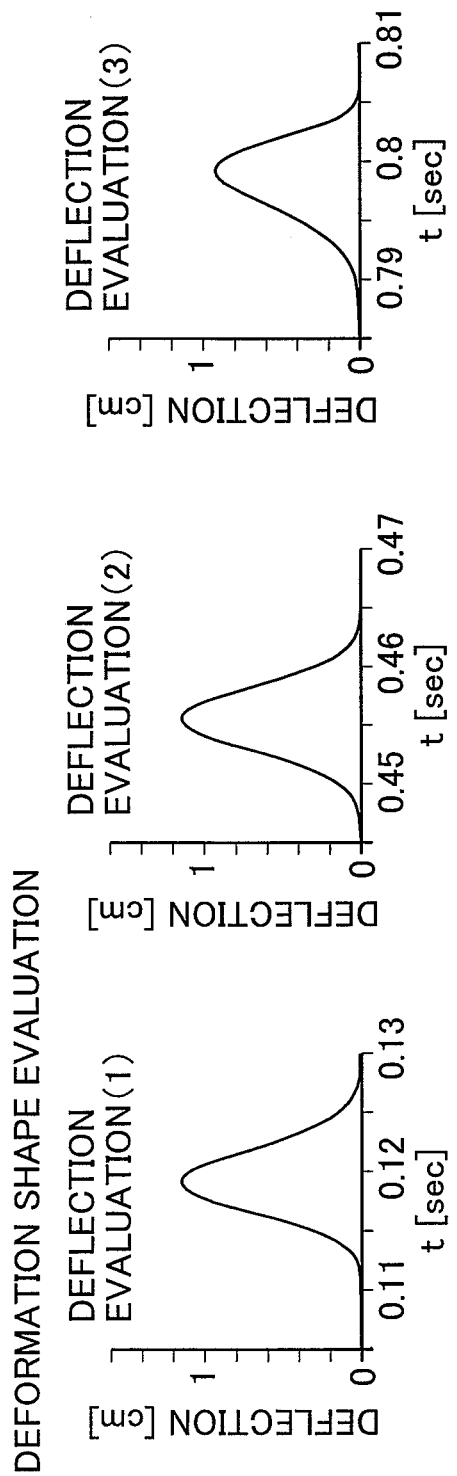
FIG. 4C is a chart showing results of evaluation on deflections obtained by the method of calculating deflection of a rotating tire according to the present invention.

FIG. 3 is a flowchart showing a method of calculating deflection of a rotating tire implemented in the tire deformation shape evaluating apparatus 10. FIGS. 4A, 4B, and 4C are charts showing results obtained in steps of the method of calculating deflection of a rotating tire. In either case, deflection in the radial direction at the tread portion of the tire is calculated from the measurement data of acceleration (acceleration data) in the radial direction (direction along radius) which is output from the acceleration sensor 2. FIG. 4A shows the measurement data for a time period during which the tire tread portion rotates 11 rounds and a certain point on the circumference of the tread portion makes contact with the ground 11 times. Three graphs in FIG. 4B show the results of least-square regression using the measurement data each obtained at the second contact, 6th contact, and 10th contact in FIG. 4A, respectively. Three graphs in FIG. 4C show the results of tire deformation shape evaluation using the measurement data each obtained at the second contact, the 6th contact, and 10th contact in FIG. 4A, respectively.

The measurement time series data of radial acceleration amplified by the amplifier 4 is supplied to the data acquiring unit 12, and is sampled with a predetermined sampling frequency to acquire digitized measurement data (Step S100).

Then, the acquired measurement time series data is supplied to the signal processing unit 14, and is subjected to smoothing processing with a filter (Step S102).

The measurement data supplied to the signal processing unit 14, as it contains many noise components, is subjected to smoothing processing to obtain smoothed measurement time series data of radial acceleration Az, as shown in FIG. 4A.

As the filters, for example, digital filters that assume a certain frequency as a cut-off frequency may be used. The cut-off frequency changes depending on rotation speeds or noise components. For example, if the rotation speed is 60 (km/h), the cut-off signal is set between 0.5 and 2 (kHz). Alternatively, instead of using the digital filters, smoothing processing may be performed using moving average process, trend model process, and other suitable processes.

The graph shown in FIG. 4A, in which acceleration Az (G) is given in the vertical axis and time t (sec.) is given in the horizontal axis, shows the measurement time series data for about one second, corresponding to a period from a slip angle of 0 degree to a slip angle to 20 degree.

In the measurement time series data Az (t) of radial acceleration Az, a time $t_c$ at which the radial acceleration Az becomes minimum, is provisionally selected as the contact center time. Then, assuming that the tire rotation phase angle (angle θ with respect to the point O in FIG. 1) at $t=t_c$ is $Q_c$, the acceleration data of a range corresponding to, for example, Qc±57.5 degree (or any desired range) is extracted as the data region to be regressed (Step 103). In FIG. 4B, dots represent the obtained measurement time series data of radial acceleration Az, solid lines represent regression results which will be described later, and dashed lines represent low frequency background components due to tire rotation.

Specifically, since the measurement time series data Az (t) contains low frequency background components caused by acceleration components of centrifugal force (centripetal force) during tire rotation, and from acceleration components of gravitational force, the low frequency background components are regressed by using polynomial, as will be described later. This enables the low frequency background components included in the measurement time series data Az (t) to be removed when calculating deflection using deflection function expressions.

Then, data in the data region to be regressed is subjected to least-square regression by using FORMULAS (2-1), (2-2) (Step S104). In FORMULA (2-2), $d^2T(s)/ds^2$ corresponds to a second-order differential function expression of a peak shaped deflection function expression T(t) represented by FORMULA (3-1) which will be described later. In FORMULA (2-2), B(s) represents the background component acceleration, other than the acceleration due to deflection deformation of the tire. The background component B(s) changes more moderately than $d^2T(s)/ds^2$ even in the vicinity of contact, and is described herein for convenience by using a $5^{th}$ order polynomial. However, any other function expression may also be used. The parameters to be determined by regression are those for defining $t_c$, T(s), (T(t)), and B(s). In specific, those parameters are a, c, and d, shown in FORMULA (3-1), and coefficients $e_0$ to $e_5$ shown in FORMULA (2-3). While there is no limitation to the method for regression in the present invention, Newton-Raphson method, for example, may preferably be used.

[Formula 2]

$$s = t - t_c \qquad \text{Formula (2-1)}$$

$$A_z(t) = \frac{d^2 T(s)}{ds^2} + B(s) \qquad \text{Formula (2-2)}$$

$$B(s) = e_0 s^5 + e_1 s^4 + e_2 s^3 + e_3 s^2 + e_4 s + e_5 \qquad \text{Formula (2-3)}$$

T(s): finite peak function expression (asymmetrical Gaussian type)

B(s): low frequency background component (5th order polynomial)

In general, deflection at a tread portion of a tire when rotating on a road surface presents a peak shape, in which deflection starts from zero, then increases at the front edge of the tire step-in area near the contact, then reaches the maximum around the area just under the load, and then gradually decreases from the tire step-out edge to zero. In addition, such peak shape indicates an asymmetric shape during cornering, braking, and driving.

On the other hand, the deflection function expression T(t) in FORMULA (3-1) below presents a peak shape having a peak value at substantially central part (t=0), and a curve on both sides of the peak gradually approaching to zero, where T(t) is given in the vertical axis, and t is given in the horizontal axis. FORMULA (3-1) is an example of an asymmetrical Gaussian function expression. As compared to a symmetrical Gaussian function expression of G(x)=e□exp(−At²), (where A is a parameter), an asymmetrical Gaussian function expression is defined herein as "a function expression that represents different curve shapes depending on whether t is in a positive region or a negative region, while having the same characteristic convergence toward zero at t=−∞, t=+∞."

Accordingly, by using T(t) of FORMULA (3-1) below as the deflection function expression, the distribution of deflections of an actual tire can preferably be reproduced.

[Formula 3]

$$T(t) = a \cdot \exp\left(-\frac{t^2}{ct + d}\right) \qquad \text{Formula (3-1)}$$

Figure 5A:
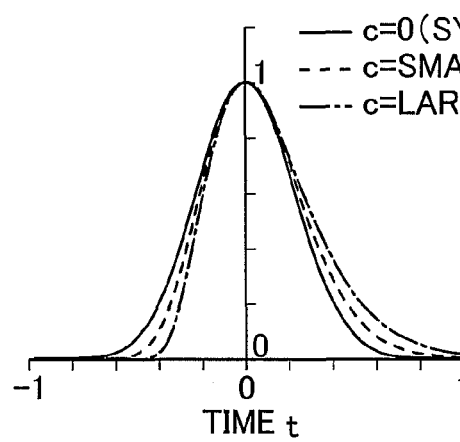
FIG. 5A shows typical peak shaped waveforms of deflection function expressions.
Figure 5B:
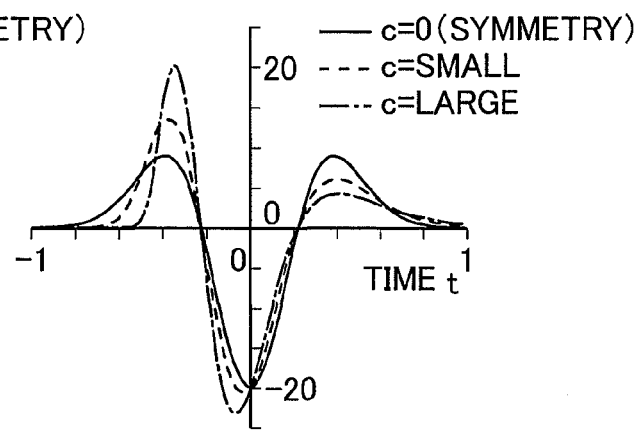
FIG. 5B shows second-order differential waveforms of the deflection function expressions shown in FIG. 5A.

The deflection function expression T(t) is an asymmetrical Gaussian type function expression in which symmetry may collapse depending on parameter c, as shown in FIG. 5A, and further as shown in FIG. 5B that shows the second order differential function expression. This asymmetry can be utilized to obtain the distribution of deflections of a tire during cornering, braking, or driving.

It should be noted that the peak shape of the deflection function expression T(t) shown in FIGS. 5A and 5B, and expressed in FORMULA (3-1) is a function expression having a positive peak value (extreme value), i.e., maximum value. However, a function expression having a negative peak value, i.e., minimum value may also be used by the positive/negative inversion of the parameter.

As described above, among the parameters obtained by least-square regression, the deflection function expression which is defined by using $t_c$ and parameter values (a, c, d) for T(t), excluding coefficients $e_0$ to $e_5$, is used to calculate a deformation shape (distribution of deflections). The processing such as the above-described least-square regression is performed by the calculating unit 16. Then, the parameter values and the peak value in the distribution of deflections are accumulated in the memory 20, as data (Step S105).

Such process, as it requires only one time of least-square regression, can be performed automatically at high speed each time when a tire makes one round of tire rotation, and the calculated parameter values and peak value are stored each time.

As described above, parameter values for the deflection function expression are calculated each time when a tire makes one round of tire rotation. Therefore when setting a contact center time $t_c$, which is a parameter, the previous contact center time $t_c$ can be used for predicting and provisionally setting a contact center time $t_c$ to be used in processing for the next one round of tire rotation.

Specifically, based on the contact center time $t_c$ ($t_{c1}$, $t_{c2}$ ... $t_{ci}$) of the previous rounds of tire rotation, a provisional value for the contact center time $t_c$ for the next one round of tire rotation can be determined as $t_{c(i+1)} = t_{ci} + (t_{ci} - t_{c(i-1)})$ (where i is a natural number). Based on the value thus obtained, acceleration data in a range corresponding to a tire rotation phase angle of $Q_c \pm 57.5$ degree, where $Q_c$ corresponds to the contact center time $t_c$, is extracted as data region to be regressed. This operation is repeated so that the contact deformation shape (distribution of deflections) is continually calculated for all of the rounds in measurement time series.

Based on the parameters thus calculated, the rotation orbit and the dynamic contact length of the tire are determined in the following manner (Step S106).

First, as the parameter values (a, c, d) for deflection function expression T(t) and the radius r of the tire are already known, a curve represented by the deflection function expression T(t) is developed as displacement on an arc of radius r and the displacement is added to the arc, whereby the rotation orbit is calculated. Then, the dynamic contact length of the tire during rotation (contact length during tire rotation) can be obtained in the calculating unit 16 in the following manner.

Figure 6:
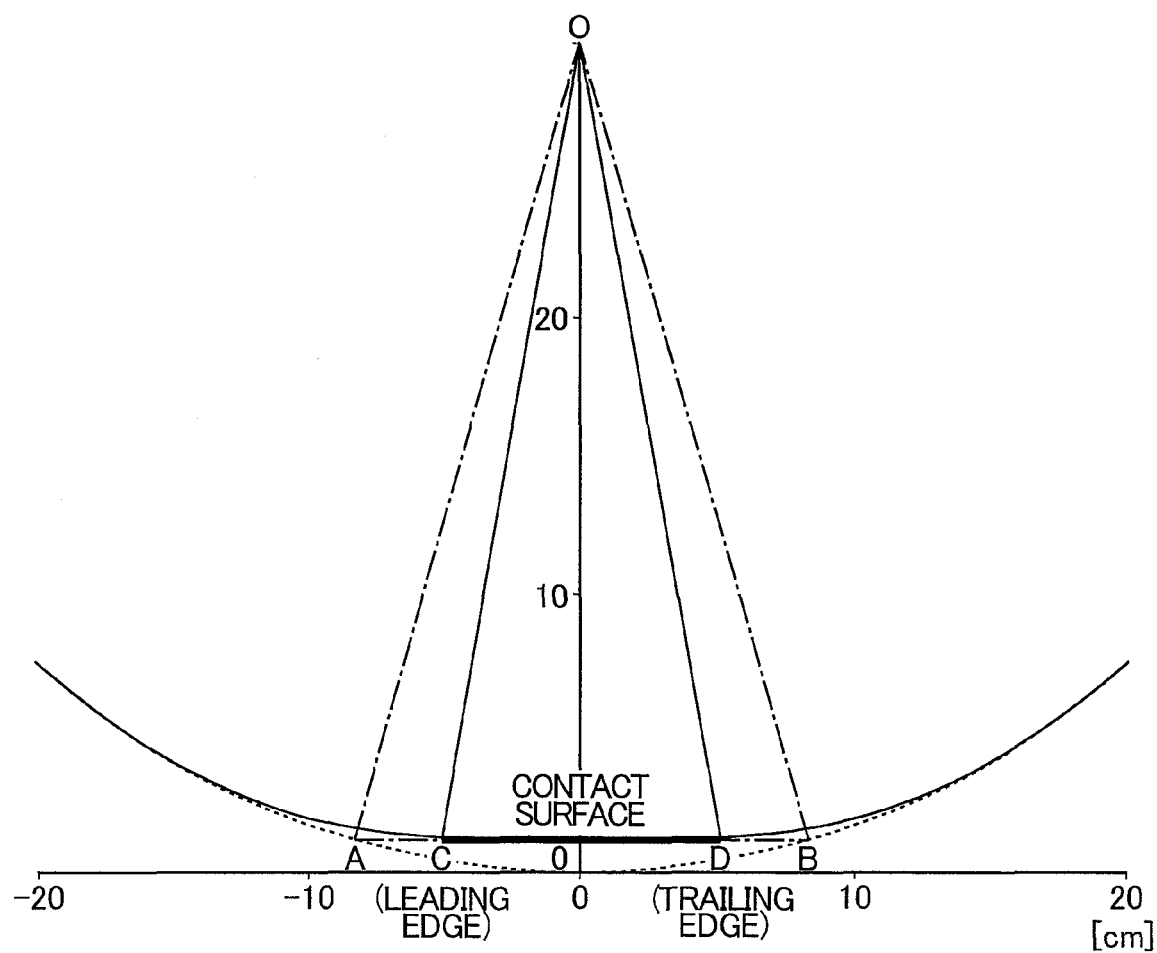
FIG. 6 is an explanatory chart showing a method of determining a dynamic contact length from the distribution of deflections.

FIG. 6 shows a method of determining a dynamic contact length from the deformation shape as shown in FIG. 4.

In FIG. 6, intersections between a horizontal line touching a lowest point of the tire rotation orbit and an arcuate shaped rotation orbit representing zero deflection are determined as A, B. The center of tire rotation is determined as O. Points on the horizontal line are determined as point C and point D, provided that the angle ∠COD created by the points C, D and the center of tire rotation O, has a certain angle between 50 to 95% of the angle ∠AOB created by intersections A, B and the center of tire rotation O, preferably between 60 to 75% (predetermined ratio, a value of the ratio is set previously). Then the length between the point C and the point D is determined as the contact length of the tire during rotation. In this way, the dynamic contact length is determined from the rotation orbit of the tire.

In this embodiment, T(t) shown in FORMULA (3-1) is used as the deflection function expression of a peak shape. However, this is an example and the present invention is not limited to this. For example, deflection function expressions T(t) shown in FORMULAS (4-1), (4-2), (4-3), and (4-4) may also be used.

[Formula 4]

$$T(t) = a \cdot \exp\left(-\frac{t^2}{d}\right) \quad \text{Formula (4-1)}$$

$$T(t) = \frac{a^2}{t^2 + d} \quad \text{Formula (4-2)}$$

$$T(t) = \frac{a}{t^2 + ct + d} \quad \text{Formula (4-3)}$$

$$T(t) = a|t|^P \quad \text{Formula (4-4)}$$

FIGS. 7A, 7B, and 7C show variation of mounting positions of acceleration sensors 2.

FIG. 7A shows an example in which an acceleration sensor 2 is mounted above the belt ply 5. FIG. 7B shows an example in which an acceleration sensor 2 is mounted inside the tread portion 1a. FIG. 7C shows an example in which a plurality of acceleration sensors 2 (five acceleration sensors in this example) are mounted on the liner portion 1b of the inner periphery of the tread portion, across all over the contact region in the tire width direction.

When a plurality of acceleration sensors 2 are arranged in the tire width direction, a distribution of deflections and thereby a dynamic contact length at various positions in the tire width direction can be obtained. Therefore, by arranging the dynamic contact lengths in the order of positions in the tire width direction, the distribution of dynamic contact lengths can be obtained.

Figure 8:
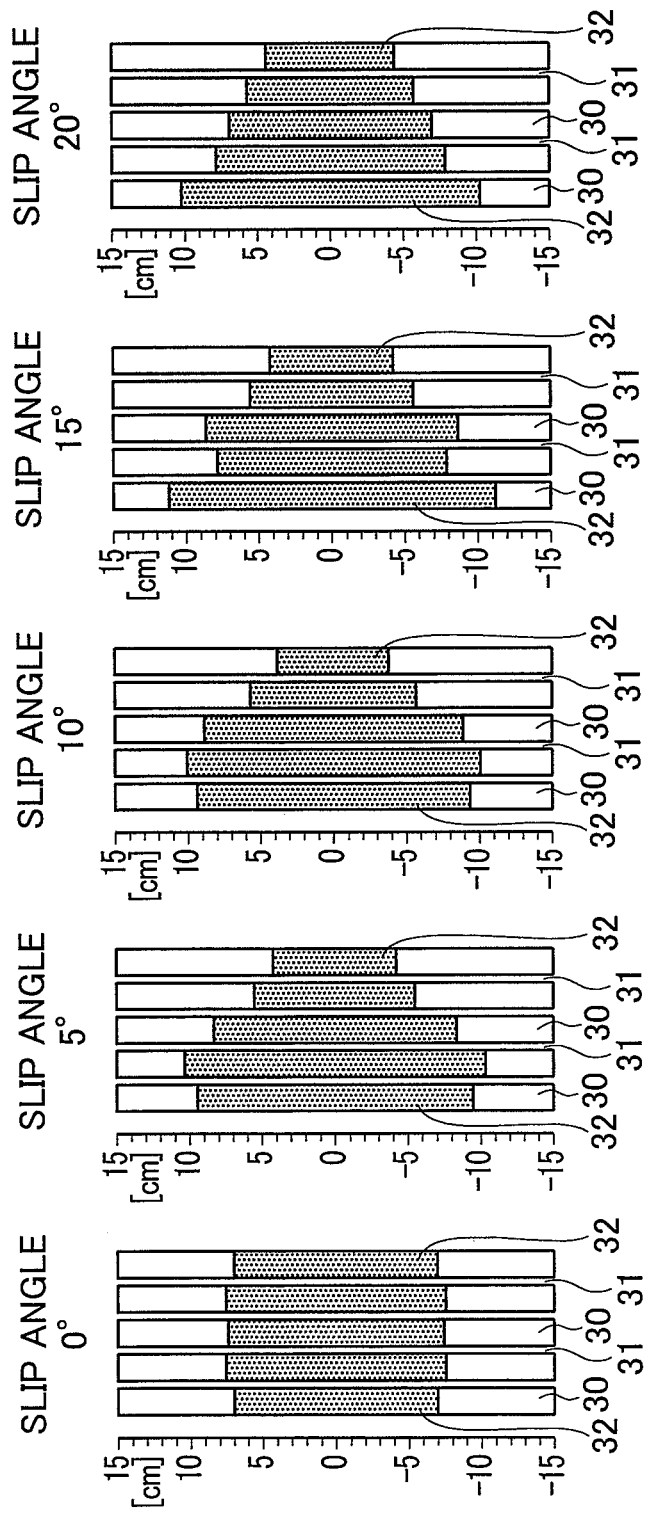
FIG. 8 is a chart showing examples of distributions of contact lengths in the tire width direction obtained by the method of calculating deflection of a rotating tire according to the present invention.

FIG. 8 shows charts schematically showing the contact length in each position in the tire width direction obtained by the method shown in FIG. 6. In the charts, the contact lengths are obtained by detecting measurement data of radial accelerations by five acceleration sensors 2 (refer to FIG. 7C) while changing a slip angle of the contact surface during rotating, such as 0, 5, 10, 15, or 20 (degree). In FIG. 8, reference numeral 30 denotes a tread rib, reference numeral 31 denotes a tread groove, and reference numeral 32 denotes a dynamic contact length at each tread rib 30, which is calculated based on radial acceleration. The pattern charts of these types can be reproduced on the display 24, so that the contact surface shape during tire rotation can be estimated.

It should be understood that the present invention is not limited to the above embodiments, and rather covers all modifications equivalents, and alternatives without departing from the spirit of the invention.

The invention claimed is:

1. A method of calculating deflection of a rotating tire that calculates a distribution of deflections at a tire tread portion in a radial direction of the tire when the tire is rotating on a road surface, the method comprising:

an acquiring step of acquiring measurement time series data of acceleration in a radial direction at a predetermined position on a tire circumference of a rotating tire;

a least-square regression step of extracting acceleration data in a vicinity of a contact region of the tire from the acquired measurement time series data of acceleration at the predetermined position on the tire circumference, and, using a deflection function expression that represents a peak shape having a peak value and a curve which is gradually approaching to zero on both sides of the peak shape as a function expression for reproducing the distribution of deflections at the tire tread portion, subjecting the extracted acceleration data to least-square regression using a second-order differential function expression of the deflection function expression to determine deflection function parameter value of the deflection function expression, solely from the acquired time series data of acceleration; and a calculation step of calculating reproduced distribution of deflections of the rotating tire from the deflection function expression the deflection function parameter values of which have been determined.

2. The method of calculating deflection of a rotating tire according to claim 1, wherein the deflection function expression that represents the peak shape and reproduces an asymmetric shape of the distribution of deflections during cornering, braking, and driving of the tire is an asymmetrical Gaussian type function expression having a curve representing an asymmetrical shape on both sides of a peak, in accordance with the parameter values.

3. The method of calculating deflection of a rotating tire according to claim 1, wherein the deflection function expression is any one of formulas (1-1), (1-2), (1-3), (1-4) and (1-5) below:

[Formula 1]

$$T(t) = a \cdot \exp\left(-\frac{t^2}{ct+d}\right) \quad \text{Formula (1-1)}$$

$$T(t) = a \cdot \exp\left(-\frac{t^2}{d}\right) \quad \text{Formula (1-2)}$$

$$T(t) = \frac{a^2}{t^2+d} \quad \text{Formula (1-3)}$$

$$T(t) = \frac{a}{t^2+ct+d} \quad \text{Formula (1-4)}$$

$$T(t) = a|t|^p \quad \text{Formula (1-5)}$$

wherein T(t) denotes the deflection function expression, t denotes a time, and a, c, d, and p denote the deflection function parameter values.

4. The method of calculating deflection of a rotating tire according to claim 1, wherein the measurement time series data of acceleration in the radial direction is data acquired by an acceleration sensor mounted on the tire tread portion, the acceleration sensor being adapted for measuring acceleration in the radial direction.

5. The method of calculating deflection of a rotating tire according to claim 4, wherein the acceleration sensor is mounted at a center in a width direction of the tire tread portion, on a liner portion, on an outer periphery of a belt ply, or inside a cap tread.

6. The method of calculating deflection of a rotating tire according to claim 4, wherein as the acceleration sensor, a plurality of acceleration sensors are mounted on the tire tread portion in the width direction, and measurement time series data of acceleration in the radial direction is obtained from each of the plurality of acceleration sensors.

7. The method of calculating deflection of a rotating tire according to claim 5, wherein as the acceleration sensor, a plurality of acceleration sensors are mounted on the tire tread portion in the width direction, and measurement time series data of acceleration in the radial direction is obtained from each of the plurality of acceleration sensors.

8. A method of accumulating data of a rotating tire, comprising:

an acquiring step of acquiring measurement time series data of acceleration in a radial direction at a predetermined position on a tire circumference of a rotating tire;

a least-square regression step for extracting acceleration data in a vicinity of a contact region of the tire from the acquired measurement time series data of acceleration at the predetermined position on the tire circumference, and, using a deflection function expression that represents a peak shape having a peak value and a curve which is gradually approaching to zero on both sides of the peak shape as a function expression for reproducing the distribution of deflections at the tire tread portion, subjecting the extracted acceleration data to least-square regression using a second-order differential function expression of the deflection function expression to determine deflection function parameter value of the deflection function expression, solely from the acquired time series data of acceleration; and an accumulating step of accumulating the deflection function parameter values of the deflection function expression determined in the least-square regression step as data at every round of tire rotation.

9. A method of calculating a contact length of a rotating tire, comprising:

an acquiring step of acquiring measurement time series data of acceleration in a radial direction at a predetermined position on a tire circumference of a rotating tire;

a least-square regression step for extracting acceleration data in a vicinity of a contact region of the tire from the acquired measurement time series data of acceleration at the predetermined position on the tire circumference, and, using a deflection function expression that represents a peak shape having an peak value and a curve which is gradually approaching to zero on both sides of the peak shape as a function expression for reproducing the distribution of deflections at the tire tread portion, subjecting the extracted acceleration data to least-square regression using a second-order differential function expression of the deflection function expression to determine deflection function parameter value of the deflection function expression, solely from the acquired time series data of acceleration;

a calculation step of calculating the reproduced deflection in a vicinity of the contact region from the deflection function expression the deflection function parameter values of which have been determined; and a contact length calculating step for calculating a contact length of the rotating tire based on the deflection of the tire which is calculated in the calculation step.

10. The method of calculating a contact length of a rotating tire according to claim 9, includes: determining, in a tire rotation orbit represented by the curve of the deflection function expression that is determined by the deflection function parameter values, intersections between a horizontal line touching to a lowest point of the tire rotation orbit and an arcuate shaped rotation orbit representing zero deflection as A, B; determining a center of tire rotation as O; determining points on the horizontal line as point C and point D, provided that an angle ∠COD which is created by the points C and D, and the center of tire rotation O has a certain angle from 50 to 95% of an angle ∠AOB which is created by the intersections A, B and the center of tire rotation O; and determining the length between the point C and the point D as the contact length of the rotating tire.

11. The method of calculating deflection of a rotating tire according to claim 1, further comprising: a smoothing processing step of performing smoothing processing on the measurement time series data of acceleration in the radial direction acquired by the acquiring step to remove noise components of the acquired measurement time series data of acceleration and obtain the smoothed measurement time series data of acceleration before the least-square regression step.

12. The method of calculating deflection of a rotating tire according to claim 1, wherein the least-square regression step selects a time t at which radial acceleration becomes minimum as a contact center time to in the measurement time series data Az(t) of acceleration in the radial direction, extracts the measurement time series data Az(t) of acceleration in the radial direction within a range corresponding to a predetermined angle range a center of which is a tire rotation phase angle in case of a time t equal to the contact center time $t_c$ ($t=t_c$) as acceleration data in the vicinity of the contact region of the tire in data region to be regressed, subjects the extracted acceleration data in the data region to be regressed to the least-square regression by using following formulas (2-1) and (2-2) represented by the deflection function expression T(t) and a polynomial B(t) representing low frequency background acceleration components due to tire rotation which are other than acceleration due to deflection deformation of the tire and are contained in the measurement time series data Az(t) of acceleration in the radial direction, $$S = t - t_c \quad (2\text{-}1)$$

$$AZ(s) = d^2T(s)/ds^2 + B(s) \quad (2\text{-}2),$$

obtain coefficients of the deflection function expression T(t) and the polynomial B(t) as parameters to determine the deflection function parameter values of the deflection function expression T(t), and removes the low frequency background acceleration components contained in the measurement time series data Az(t) of acceleration in the radial direction to determine the deflection function expression T(t).

13. The method of calculating deflection of a rotating tire according to claim 12, wherein, when the deflection function expression T(t) is represented by using a following formulas (3-1) and the polynomial B(t) is represented by using a following formulas (2-3), $$T(t) = a \cdot \exp\left(-\frac{t^2}{ct+d}\right) \quad (3\text{-}1)$$

$$B(t) = e_0 t^5 + e_1 t^4 + e_2 t^3 + e_3 t^2 + e_4 t + e_5 \quad (2\text{-}3)$$

Wherein a, c, d, and $e_0$ to $e_5$ denote the parameters, and a, c and d denote the deflection function parameter values of the deflection function expression T(t).

14. The method of accumulating data of a rotating tire according to claim 8, wherein the least-square regression step selects a time t at which radial acceleration becomes minimum as a contact center time $t_c$ in the measurement time series data Az(t) of acceleration in the radial direction, extracts the measurement time series data Az(t) of acceleration in the radial direction within a range corresponding to a predetermined angle range a center of which is a tire rotation phase angle in case of a time t equal to the contact center time $t_c$ ($t=t_c$) as acceleration data in the vicinity of the contact region of the tire in data region to be regressed, subjects the extracted acceleration data in the data region to be regressed to the least-square regression by using following formulas (2-1) and (2-2) represented by the deflection function expression T(t) and a polynomial B(t) representing low frequency background acceleration components due to tire rotation which are other than acceleration due to deflection deformation of the tire and are contained in the measurement time series data Az(t) of acceleration in the radial direction, $$S = t - t_c \quad (2\text{-}1)$$

$$AZ(s) = d^2T(s)/ds^2 + B(s) \quad (2\text{-}2),$$

obtain coefficients of the deflection function expression T(t) and the polynomial B(t) as parameters to determine the deflection function parameter values of the deflection function expression T(t), and removes the low frequency background acceleration components contained in the measurement time series data Az(t) of acceleration in the radial direction to determine the deflection function expression T(t).

15. The method of accumulating data of a rotating tire according to claim 14, wherein, when the deflection function expression T(t) is represented by using a following formulas (3-1) and the polynomial B(t) is represented by using a following formulas (2-3), $$T(t) = a \cdot \exp\left(-\frac{t^2}{ct+d}\right) \quad (3\text{-}1)$$

$$B(t) = e_0 t^5 + e_1 t^4 + e_2 t^3 + e_3 t^2 + e_4 t + e_5 \quad (2\text{-}3)$$

Wherein a, c, d, and $e_0$ to $e_5$ denote the parameters, and a, c and d denote the deflection function parameter values of the deflection function expression T(t).

16. The method of calculating a contact length of a rotating tire according to claim 9, wherein the least-square regression step selects a time t at which radial acceleration becomes minimum as a contact center time $t_c$ in the measurement time series data Az(t) of acceleration in the radial direction, extracts the measurement time series data Az(t) of acceleration in the radial direction within a range corresponding to a predetermined angle range a center of which is a tire rotation phase angle in case of a time t equal to the contact center time $t_c$ ($t=t_c$) as acceleration data in the vicinity of the contact region of the tire in data region to be regressed, subjects the extracted acceleration data in the data region to be regressed to the least-square regression by using following formulas (2-1) and (2-2) represented by the deflection function expression T(t) and a polynomial B(t) representing low frequency background acceleration components due to tire rotation which are other than acceleration due to deflection deformation of the tire and are contained in the measurement time series data Az(t) of acceleration in the radial direction, $$S = t - t_c \quad (2\text{-}1)$$

$$AZ(s) = d^2T(s)/ds^2 + B(s) \quad (2\text{-}2),$$

obtain coefficients of the deflection function expression T(t) and the polynomial B(t) as parameters to determine the deflection function parameter values of the deflection function expression T(t), and removes the low frequency background acceleration components contained in the measurement time series data Az(t) of acceleration in the radial direction to determine the deflection function expression T(t).

17. The method of calculating a contact length of a rotating tire according to claim 16, wherein, when the deflection function expression T(t) is represented by using a following formulas (3-1) and the polynomial B(t) is represented by using a following formulas (2-3), $$T(t) = a \cdot \exp\left(-\frac{t^2}{ct+d}\right) \quad (3\text{-}1)$$

$$B(t) = e_0 t^5 + e_1 t^4 + e_2 t^3 + e_3 t^2 + e_4 t + e_5 \quad (2\text{-}3)$$

Wherein a, c, d, and $e_0$ to $e_5$ denote the parameters, and a, c and d denote the deflection function parameter values of the deflection function expression T(t).

* * * * *